United States Patent [19]

Nembach

[11] Patent Number: 4,528,871
[45] Date of Patent: Jul. 16, 1985

[54] HYDROSTATIC DRIVE FOR VEHICLES

[75] Inventor: Siegfried Nembach, Immenstaad, Fed. Rep. of Germany

[73] Assignee: Zahnradfabrik Friedrichshafen AG, Fed. Rep. of Germany

[21] Appl. No.: 486,862

[22] Filed: Apr. 20, 1983

[30] Foreign Application Priority Data

May 5, 1982 [DE] Fed. Rep. of Germany ....... 3216821

[51] Int. Cl.$^3$ ............................................. F16H 47/00
[52] U.S. Cl. ...................... 74/733; 180/243; 180/242
[58] Field of Search .................. 180/243, 242; 74/732, 74/730, 731, 733, 861, 856

[56] References Cited

U.S. PATENT DOCUMENTS

| | | | |
|---|---|---|---|
| 3,053,043 | 9/1962 | Knowler | 180/243 X |
| 3,561,557 | 2/1971 | Magnuson et al. | 180/65.2 |
| 3,736,732 | 6/1973 | Jennings et al. | 180/243 X |
| 3,918,546 | 11/1975 | Chichester et al. | 180/243 |
| 3,952,511 | 4/1976 | Turner et al. | 180/242 X |
| 3,978,937 | 9/1976 | Chichester et al. | 180/242 |
| 4,186,816 | 2/1980 | Pfundstein | 180/243 |
| 4,341,133 | 7/1982 | Sakamoto | 74/733 |
| 4,396,087 | 8/1983 | Rock et al. | 180/243 |

FOREIGN PATENT DOCUMENTS

| | | |
|---|---|---|
| 2045232 | 3/1972 | Fed. Rep. of Germany ........ 74/856 |
| 2452835 | 5/1975 | Fed. Rep. of Germany . |
| 2921756 | 12/1979 | Fed. Rep. of Germany . |
| 3035522 | 5/1982 | Fed. Rep. of Germany . |
| 56-112327 | 9/1981 | Japan ................................. 180/243 |
| 2057605 | 4/1981 | United Kingdom .................. 74/865 |
| 2057606 | 4/1981 | United Kingdom .................. 74/861 |

Primary Examiner—George H. Krizmanich
Assistant Examiner—Dirk Wright
Attorney, Agent, or Firm—Hayes, Davis & Soloway

[57] ABSTRACT

The invention provides a hydrostatic drive for vehicles, especially for the drive wheels of automotive heavy processing machines that have a drive for main drive wheels via a multispeed gear transmission and a drive for auxiliary drive wheels, wherein the drives for both the auxiliary drive wheels and the main drive wheels are hydrostatic. These hydrostatic drives each comprise an adjustable pump and an adjustable motor. A multispeed gear transmission is provided between the main drive motor and the main drive wheels and a clutch is provided between the adjustable motor and the auxiliary drive wheels. To obtain a higher travel speed, it is possible to disconnect the auxiliary drive and to switch, via a changeover valve, the delivery of the adjustable pump from the auxiliary drive to the main drive. Thereby is obtained the advantage that through the same control of both main and auxiliary drive wheels there is ensured a functional interplay of the drives. By switching the delivery of the adjustable pump of the auxiliary drive to the main drive, the working capacity of the vehicle's main drive engine is optimally utilized, since the operation of the auxiliary drive wheels at high travelling speed is not used and the drive of the main drive wheels is correspondingly reinforced.

9 Claims, 1 Drawing Figure

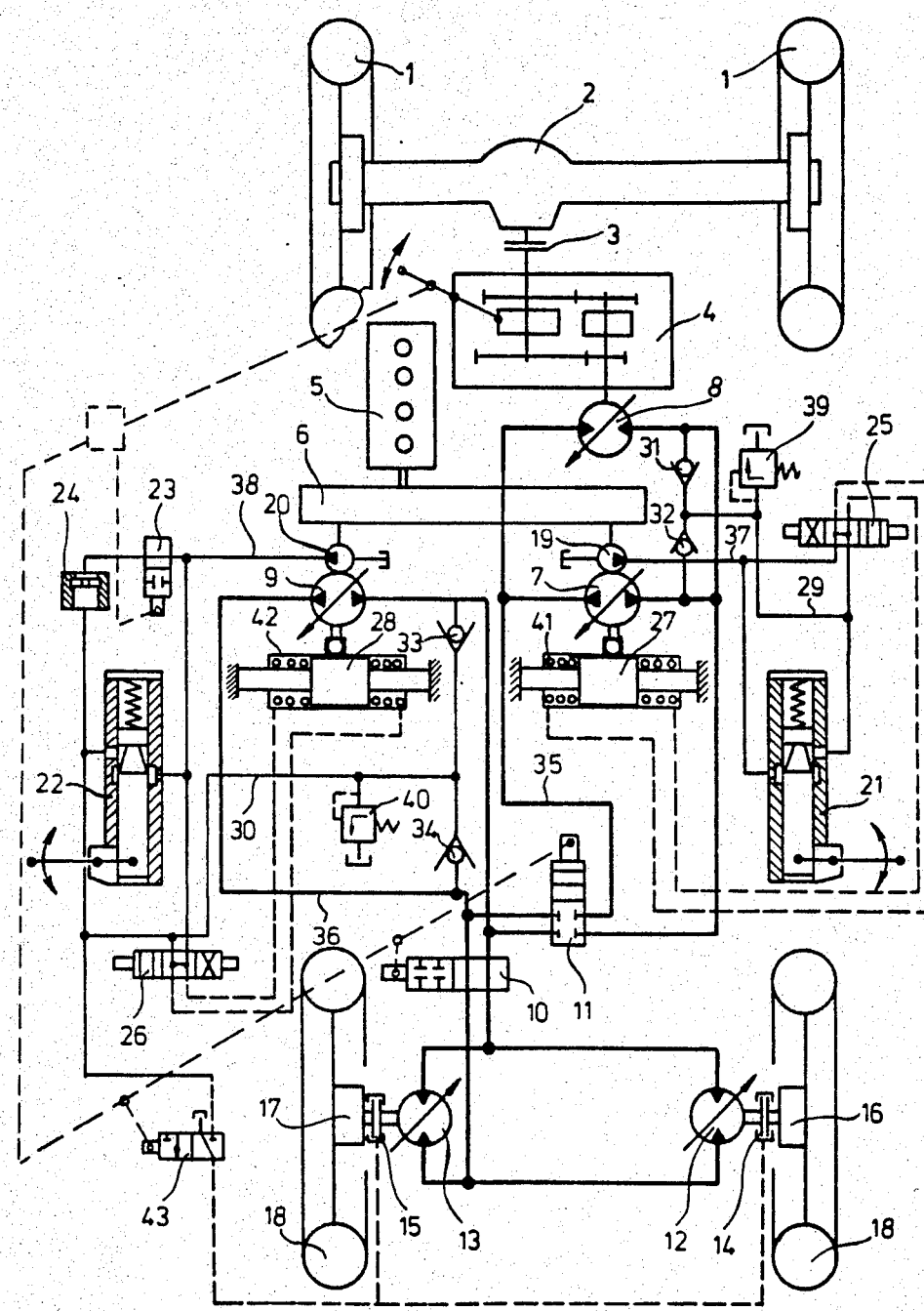

HYDROSTATIC DRIVE FOR VEHICLES

The invention concerns itself with a hydrostatic transmission for vehicles, particularly, though not exclusively, for heavy duty vehicles that work on unfavorable soil conditions.

In a typical prior art hydrostatic transmission, a multispeed gear mechanism and a hydrostatic transmission for all drive wheels are driven directly by the main drive engine of the vehicle, the main drive wheels being driven by the multispeed gear mechanism, purely mechanically by means of drive shafts, Cardan drives, etc., while the hydrostatic transmission has an adjustable pump for driving hydromotors, that drive auxiliary drive wheels, connected therewith by means of conduits. At the same time there can be provided between the hydromotors and the auxiliary drive wheels, clutches, transmission gearing and similar driving elements.

Known already are transmissions of the above mentioned kind wherein both the main drive wheels and the auxiliary drive wheels are driven, in the lower speed gears, i.e. while in the highest transmission ratios (e.g. 1st and 2nd gears), while in the higher speed gears (e.g. 3rd, 4th, etc. gears) only the main drive wheels are driven. To achieve this, the hydrostatic auxiliary drive is often coupled to the gear shift and is operated only in the 1st and 2nd forward and reverse gears and is disconnected in the other gears.

For satisfactory operation it is necessary that the auxiliary drive wheels be driven so that the peripheral speed thereof corresponds as precisely as possible to the peripheral speed of the main drive wheels or that in the case of certain operations they have a peripheral speed slightly higher than the main drive wheels. This relationship of the peripheral speeds must be maintained over the whole speed range of all driven wheels.

In addition, it is desirable to regulate the power of the hydrostatic drive circuit for the auxiliary drive wheels for optimal utilization of the generated power (to provide adaptation to the soil conditions, change in the direction of travel, etc.). In addition, an overload protection of the main drive engine is desirable and necessary.

To meeting these conditions there have already been made a series of suggestions, all of which include more or less complicated control systems that work electrically or electronically. Thus, for example, West German laid-open application No. 29 21 756 (U.S. Pat. No. 4,186,816) has disclosed an electronic control for vehicles that has a main drive and a hydrostatic auxiliary drive of the above mentioned kind wherein the respective speeds are measured by means of sensors in the main drive and the auxiliary drive is controlled in accordance with the measured value.

The coordination of an alternating current generator with the main drive (see U.S. Pat. No. 3,561,557) has also been disclosed for the dependent control of the drive wheels.

These systems are expensive and can only be used for the control of the hydrostatic drive for the auxiliary drive wheels.

West German laid-open application No. 24 52 835 (U.S. Pat. No. 3,918,546) has disclosed a hydrostatic auxiliary transmission for vehicles, that connects and disconnects the auxiliary drive wheels via a control device and which comprises a constant speed pump, a control pump, a flow divider valve, a throttle and directional valves. This already known control apparatus does not make it possible to actuate the auxiliary drive wheels in accordance with the torque that appears therein in dependence on the load.

It has been proposed (West German Pat. No. P 30 35 522.7) to construct the hydrostatic auxiliary drive in which the hydropump is constructed as an adjustable pump that is adjusted by the pressure of fluid flow at one or more throttle positions, against spring tension, toward a larger pump displacement volume and is adjusted by the working pressure formed in the auxiliary drive toward a lesser pump displacement volume.

This proposed drive refers only to the combination of one mechanical or hydrodynamic multispeed gear transmission in the main drive and a hydrostatic auxiliary drive. The different drives of main and auxiliary drive wheels work functionally together but have different operating characteristics.

An object of the present invention is to provide a transmission wherein both the main drive and the auxiliary drive are hydrostatic and have the same control arrangement thereby to facilitate a load-functional interplay. The control of both drives being provided in a manner such that when a relatively high travelling speed of the vehicle is needed, the driving power for the auxiliary drive can be connected to the main drive and the power of the main vehicle drive engine can be utilized in as favorable a manner as possible.

According to the invention there is provided a hydrostatic transmission arrangement for vehicles comprising a main hydrostatic transmission including a multispeed gear transmission for transmitting drive from this hydrostatic transmission to main drive wheels and an auxiliary hydrostatic transmission for driving auxiliary drive wheels, each transmission comprising a hydrostatic pump adapted to be driven by a main vehicle drive engine, a fixed displacement control pump adapted to provide a fluid output in proportion to the speed of said main vehicle drive engine and a hydrostatic motor connected by a hydraulic circuit to be driven by said hydrostatic pump and mechanically connected for driving engagement with its associated drive wheels, a throttle means connected to intercept and control fluid flow from said control pump thereby to regulate operating pressure of the associated hydrostatic pump, and adjusting means responsive to fluid output pressure from the throttle means to adjust displacement of operating fluid in the transmission, said auxiliary hydrostatic transmission being connected to the auxiliary drive wheels by way of a clutch means operable to disconnect drive to these wheels when desired.

In this arrangement both auxiliary and main drives are hydrostatic and equipped with substantially identical controls thereby ensuring a desired functional interplay of both drives.

According to preferred embodiment of the invention, it is possible, in order to obtain a higher travelling speed when the auxiliary drive is disconnected, to switch, via changeover valves, the delivery of the auxiliary adjustable pump from the auxiliary drive to the main drive. By this means it is possible that the generated power of the main drive motor be optimally utilized.

The multispeed transmission can advantageously be a mechanical gear transmission. In one arrangement the auxiliary drive has two hydromotors each connected by a coupling to a different auxiliary drive wheel by way of a wheel gear.

Since the control can be optimally designed using a throttle adjustment for only one gear, in an advantageous embodiment, there are provided one or more shutters (restrictions or orifices) connectable by control valves to provide optimum operation in other gears.

To be able to coordinate the peripheral speeds of the auxiliary drive wheels and the main drive wheels, at least one of the control throttles provided according to the invention is adjustable in order to make changes in control pressure. The adjustment may be, for example, manual.

Since the speed of the main vehicle drive engine and the working pressure of the hydrostatic drive control in proportion the adjustable pump operates so as to provide, at relatively low speeds, high working pressure corresponding to a high traction and, at relatively high speeds, a low working pressure corresponding to a low traction. In addition, the hydrostatic drive arrangement according to the invention will operate even when one of the drives has a slippage which would cause a stall if a hydrodynamic drive had been used.

In a further embodiment of the invention, the hydromotors can be adjustable. This is especially appropriate when they are to be used over several gears, as the stroke-volume ratio of the pump-motor combination can be adapted to a greater range of gears. At the same time the connection and disconnection of the hydromotors can depend on the ratio of each gear so that, for example, they become operative only in the 1st and 2nd forward gears and in the reverse gear. In addition, the auxiliary drive couplings are opened in the neutral position of the gear shift.

The invention will now be described, by way of example, with reference to the accompanying drawing, which diagrammatically illustrates a hydrostatic transmission arrangement according to the invention.

With reference to the drawing, a main vehicle drive engine 5, via a power distribution gear 6, drives an adjustable hydrostatic pump 7 which in turn drives an adjustable hydrostatic motor 8. The adjustable motor 8 drives a multispeed mechanical gear transmission 4, a permanent coupling 3, a differential gear 2, and thus the main drive wheels 1. From the distribution gear 6 there is also driven an adjustable hydrostatic pump 9 which in turn drives adjustable hydrostatic motors 12 and 13 via a first, 10, of two changeover valves 10 and 11. The adjustable motors 12 and 13 are individually connected with auxiliary drive wheels 18 via couplings 14 and 15 and wheel gears 16, 17. Couplings 14 and 15 are clutches operable by a control valve 43 which is common to both couplings. The adjustable pumps 7 and 9 for the auxiliary and main drives are connected respectively with pumps 19, 20 which are main control and auxiliary control pumps.

Pumps 19, 20 provide fluid supply at a pressure proportionate to speed of the main vehicle drive engine. In the case of the auxiliary control pump 20 the fluid under pressure is communicated, by way of feed conduit 38, to (a) adjustable throttle 22; (b) via one port of directional control valve 26, to pump displacement adjusting device 28; (c) via throttle 22 and also via serially disposed control valve 23 and shutter (restriction or oriface) 24, to check valves 33,34, pressure relief valve 40; and (d) by way of another port of valve 26 to adjusting device 28 and to sequence valve 43 for the operation of clutches 14,15. By way of check valves 33,34 the auxiliary circuit 36 is charged.

In the case of the main control pump 19, the fluid under pressure is communicated, by way of feed conduit 37, to (a) adjustable throttle 21; via one port of directional control valve 25, to pump displacement adjusting device 27; (b) via throttle 21, by way of another port of valve 25 to adjusting device 27, and (c) via throttle 21, to check valves 31,32 and pressure relief valve 39. By way of check valves 31,32 main circuit 35 is charged.

Directional valves 25,26 provide manual selection of forward, neutral and reverse operation of the hydrostatic transmission.

Valve 10 as illustrated connects pump 9 with motors 12,13 while valve 11 is closed. In the alternative position of these valves 10,11, valve 10 is closed and valve 11 connects pump 9 in parallel with pump 7 to drive motor 8.

The adjusting devices 27,28 adjust the output of pumps 7,9 respectively in response to a pressure differential across the devices acting against springs 41,42 which act to bias the devices to a central operational state, and the restoring force produced by the pumps 7,9 operation.

Pressure-relief valves 39,40 in the respective control and feed circuits 37,38 prevent over pressure from occurring in the transmission.

The hydrostatic drive according to the invention functions as follows:

In operation in the lower gears (e.g. 1st and 2nd gears) of the multispeed gear transmission 4, both the main drive and the auxiliary drive are operational. To control the adjustable pumps 7 and 9, pumps 19 and 20 deliver, proportionally to speed of the main vehicle drive engine, an oil flow that is fed to the throttles 21 and 22 wherein there is caused in proportion to the delivery rate (the speed), a velocity head that is communicated via directional valves 25,26 to the adjusting devices 27 and 28. This velocity head causes an adjustment of the output of pumps 7,8 as the pressure acts against springs 41,42 and the restoring force of the adjustable pumps 7,9 which depends on the working pressure in the main fluid circuits 35,36.

This mode of operation, which in the case of low torque requirements, that is, low working pressure, fully adjusts the adjustable pumps to produce a relatively high travel speed and, in case of a high torque requirement corresponding to high working pressure, adjusts the adjustable pumps to produce a high pressure low flow rate to produce a relatively low travel speed. This results in a power regulation that protects the main engine 5 from overloading and allows for the requirements of the vehicle utilization.

When the multispeed gear transmission 4 is shifted from one working gear to another, the transmission ratio of the main drive changes. In order that the operation of auxiliary drive and main drive will agree when this other gear is selected, there is connected or disconnected in the auxiliary drive via the directional valve 23, the shutter 24 (an orifice of desired size). By means of this can be changed the pressure level in the control and feed circuit 38 of the auxiliary drive so that the operating characteristics of the auxiliary and main drive match.

In the higher gears predominant in road travel, the auxiliary drive, as a rule, is not needed and can be obstructive. For this purpose the auxiliary drive is disconnected by operation of directional valves 10,11, the couplings 14,15 are opened by operation of valve 43, and the oil flow from circuit 36 is communicated to the main drive circuit 35. An increase of the travel speed results from operation of circuits 35,36 in parallel in this manner. This connection and disconnection can be either manual or linked with a control mechanism in the multispeed gear transmission, that is, with the introduction of a certain speed there results a changeover of the adjustable pump 9 from the auxiliary drive supplementation of the main drive.

| LIST OF REFERENCE NUMERALS | | | |
|---|---|---|---|
| 1 | main drive wheels | 23 | auxiliary circuit mode control valve |
| 2 | differential gear | 24 | shutter (orifice) |
| 3 | coupling | 25 | directional valve |
| 4 | multispeed gear transmission | 26 | directional valve |
| 5 | main drive engine | 27 | pump adjusting device |
| 6 | power distribution gear | 28 | pump adjusting device |
| 7 | adjustable pump | 29 | pipe |
| 8 | adjustable motor | 30 | pipe |
| 9 | adjustable pump | 31 | check valve |
| 10 | changeover valve | 32 | check valve |
| 11 | changeover valve | 33 | check valve |
| 12 | adjustable motor | 34 | check valve |
| 13 | adjustable motor | 35 | main circuit |
| 14 | clutch coupling | 36 | auxiliary circuit |
| 15 | clutch coupling | 37 | control and feed conduit |
| 16 | wheel gear | 38 | control and feed conduit |
| 17 | wheel gear | 39 | pressure-relief valve |
| 18 | auxiliary drive wheels | 40 | pressure-relief valve |
| 19 | control pump | 41 | spring element |
| 20 | control pump | 42 | spring element |
| 21 | adjusting throttle | 43 | clutch coupling operation valve |
| 22 | adjusting throttle | | |

I claim:

1. A hydrostatic transmission arrangement for vehicles comprising a main hydrostatic transmission including a multispeed gear transmission for transmitting drive from this hydrostatic transmission to main drive wheels and an auxiliary hydrostatic transmission for driving auxiliary drive wheels, each transmission comprising a hydrostatic pump adapted to be driven by a main vehicle drive engine, a fixed displacement control pump adapted to provide a fluid output in proportion to the speed of said main vehicle drive engine and a hydrostatic motor connected by a hydraulic circuit to be driven by said hydrostatic pump and mechanically connected for driving engagement with its associated drive wheels, a throttle means connected to intercept and control fluid flow from said control pump thereby to regulate operating pressure of the associated hydrostatic pump, adjusting means responsive to fluid output pressure from the throttle means to adjust displacement of operating fluid in the transmission, said auxiliary hydrostatic transmission being connected to the auxiliary drive wheels by way of a clutch means operable to disconnect drive to these wheels when desired, and changeover valve means disposed in the hydraulic circuits of the main and auxiliary hydrostatic transmissions and operable when desired to disconnect the auxiliary hydrostatic motor and to connect the auxiliary hydrostatic pump in parallel with the main hydrostatic pump in the hydraulic circuit of the main hydrostatic pump, thereby to use both hydrostatic pumps to drive the main hydrostatic motor while interrupting the drive to the auxiliary drive wheels, wherein operation of changeover valve means to disconnect the auxiliary motor is arranged to open said clutch means.

2. A hydrostatic transmission arrangement according to claim 1 wherein means are provided in the hydraulic circuit of the auxiliary hydrostatic transmission to adjust the characteristics of an auxiliary hydrostatic transmission for different gear ratios of the multispeed gear transmission.

3. A hydrostatic transmission arrangement according to claim 2 wherein said means includes in the auxiliary transmission a restriction disposed in association with said throttle means and a control valve operable to allow fluid to by-pass said throttle means by way of said restriction, thereby to adjust the operating pressure of the auxiliary hydrostatic transmission and operation of the auxiliary adjusting means.

4. A hydrostatic transmission arrangement according to claim 1 wherein the throttle means is adjustable to accommodate different vehicle operating requirements.

5. A hydrostatic transmission arrangement according to claim 1 wherein each of said hydrostatic transmissions incorporates a direction valve selectively operable to provide forward, neutral and reverse operation of the associated transmission.

6. A hydrostatic transmission arrangement according to claim 1 wherein each hydrostatic pump is of adjustable displacement under the control of its associated adjusting means.

7. A hydrostatic transmission arrangement according to claim 6 wherein each hydrostatic motor is of adjustable displacement.

8. A hydrostatic transmission arrangement according to claim 1 comprising control means responsive to a gear shift of said multispeed gear transmission to operate said changeover valve means and said clutch means.

9. A hydrostatic transmission arrangement according to claim 2 comprising control means responsive to a gear shift of said multispeed gear transmission to operate said changeover valve means, said clutch means and characteristic adjusting means.

* * * * *